(12) United States Patent
Bennett, Jr.

(10) Patent No.: US 8,400,110 B2
(45) Date of Patent: Mar. 19, 2013

(54) ENERGY EFFICIENT POWER ADAPTER

(76) Inventor: James F. Bennett, Jr., Nantucket, MA (US)

( * ) Notice: Subject to any disclaimer, the term of this patent is extended or adjusted under 35 U.S.C. 154(b) by 548 days.

(21) Appl. No.: 12/645,363

(22) Filed: Dec. 22, 2009

(65) Prior Publication Data

US 2010/0302757 A1    Dec. 2, 2010

Related U.S. Application Data

(60) Provisional application No. 61/140,456, filed on Dec. 23, 2008.

(51) Int. Cl.
*H01M 10/46* (2006.01)
(52) U.S. Cl. ........................................................ 320/128
(58) Field of Classification Search .................. 320/107, 320/114, 128, 140; 363/84, 85
See application file for complete search history.

(56) References Cited

U.S. PATENT DOCUMENTS

| | | | |
|---|---|---|---|
| 5,045,768 A | 9/1991 | Pelly | |
| 5,245,220 A | 9/1993 | Lee | |
| 5,453,677 A | 9/1995 | Sakoh et al. | |
| 5,864,457 A | 1/1999 | Kates et al. | |
| 5,984,513 A * | 11/1999 | Baldwin | 361/179 |
| 6,049,144 A | 4/2000 | Frannhagen et al. | |
| 6,052,291 A | 4/2000 | Suzuki et al. | |
| 6,172,891 B1 | 1/2001 | O'Neal et al. | |
| 6,269,288 B1 | 7/2001 | Smith | |
| 6,850,039 B2 | 2/2005 | Popescu | |
| 6,867,568 B1 | 3/2005 | Olson et al. | |
| 7,123,491 B1 | 10/2006 | Kusumi | |
| 2004/0217738 A1 | 11/2004 | Cheiky et al. | |
| 2008/0043387 A1 * | 2/2008 | Weil | 361/42 |

FOREIGN PATENT DOCUMENTS

| | | |
|---|---|---|
| JP | 07-288883 A | 10/1995 |
| JP | 2000-102184 | 4/2000 |
| JP | 2000-102184 A | 4/2000 |
| JP | 2000-306449 A | 11/2000 |
| WO | WO-02/09223 | 1/2002 |
| WO | WO-03/026377 | 4/2003 |

OTHER PUBLICATIONS

International Search Report and Written Opinion for International Application No. PCT/US2009/069440 dated Aug. 20, 2010.

* cited by examiner

*Primary Examiner* — Edward Tso
(74) *Attorney, Agent, or Firm* — Foley & Lardner LLP; Joseph Teja, Jr.; Moses A. Heyward

(57) ABSTRACT

According to one embodiment, an AC power adapter for providing voltage to an electrically-operated device includes a power converter module electrically coupled to a power source via at least one hot lead and at least one neutral lead. The power converter module is configured to convert voltage received from the power source to voltage suitable for use by the electrically-operated device. The AC power adapter also includes a relay circuit coupled to the hot lead to control the voltage passing from the power source to the power converter module.

20 Claims, 3 Drawing Sheets

ENERGY EFFICIENT POWER ADAPTER

RELATED APPLICATION

This application is related to and claims priority to U.S. Provisional Patent Application Ser. No. 61/140,456 filed Dec. 23, 2008, titled "Energy Efficient Power Adapter," which is hereby incorporated by reference in its entirety herein.

FIELD OF THE INVENTION

The present invention relates generally to a power adapter and, in particular, to an energy efficient power adapter.

BACKGROUND

Standby power, also referred to as vampire power, ghost load, idle current, phantom load, or leaking electricity, refers to the electrical power consumed by electronic appliances while switched off or in a standby mode. A common example of an "electricity vampire" is an AC power adapter or wall wart that has no power-off switch. For example, an AC power adapter for a cellular telephone will continue to supply a charge even if the batteries are fully charged or if the cellular telephone is not plugged in. Other electrical devices consume standby power for functional reasons, which are at times justified (e.g., a temperature sensor on a refrigerator) or unjustified (e.g., displaying a digital clock on a radio when nobody is present). The wasted standby power of household electronic devices is typically very small for any one particular device, but in the aggregate the power consumed by all such devices within a household becomes significant.

According to the United States Department of Energy, "Many appliances continue to draw a small amount of power when they are switched off. These 'phantom' loads occur in most appliances that use electricity, such as VCRs, televisions, stereos, computers, and kitchen appliances. In the average home, 75% of the electricity used to power home electronics is consumed while the products are turned off. This can be avoided by unplugging the appliance or using a power strip and using the switch on the power strip to cut all power to the appliance." US Department of Energy, "Home Office and Home Electronics," 15 Jan. 2008 available at http://www1.eere.energy.gov/consumer/tips/home_office.html, last accessed on Dec. 3, 2008.

SUMMARY

According to one embodiment, an AC power adapter for providing voltage to an electrically-operated device includes a power converter module electrically coupled to a power source via at least one hot lead and at least one neutral lead. The power converter module is configured to convert voltage received from the power source to voltage suitable for use by the electrically-operated device. The AC power adapter also includes a relay circuit coupled to the hot lead to control the voltage passing from the power source to the power converter module.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
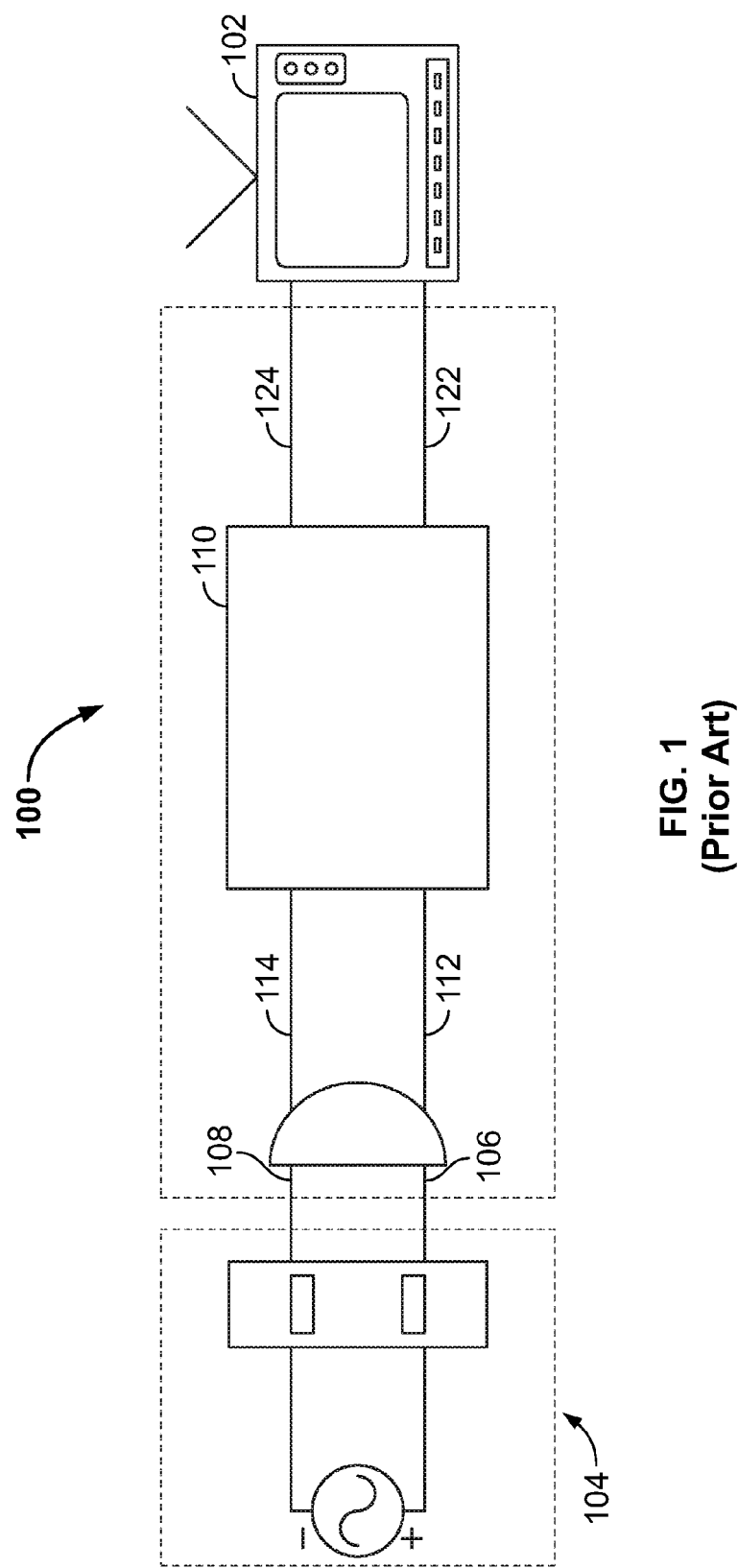
FIG. 1 illustrates a circuit diagram for a conventional AC power adapter.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention.

DESCRIPTION OF ILLUSTRATIVE EMBODIMENTS

Referring to FIG. 1, a circuit diagram is illustrated for a conventional AC power adapter 100 for connecting an electrically-operated device 102 to a power grid 104. The conventional power adapter 100 includes two contacts 106, 108 such as, for example, pins, prongs and/or blades that mechanically and electrically couple to corresponding holes and/or slots in an electrical wall socket connected to the power grid 104. One of the contacts is a hot contact 106, which passes AC voltage to the power adapter 100, and the other contact is a neutral contact 108, which returns AC voltage from the power adapter 100. It is contemplated that in some instances, the power adapter 100 may include two or more hot contacts 106 and/or an additional contact for grounding the housing of the power adapter 100. It is further contemplated that the contacts may be configured according to any suitable configuration so as to allow for mechanical and electrical coupling with a corresponding wall socket connected to the power grid. For example, the contacts of the power adapter can be configured to meet any standard domestic or international adapter and socket configuration including, but not limited to, NEMA 1-15, NEMA 5-15, JIS C 8303, CEE 7/16, CEE 7/17, BS 4573, BS 546, CEE 7/4, Gost 7396, CEE 7/7, BS 1363, S132, AS 3112, CPCS-CCC, IRAM 2073, SEV 1011, CEI 23-16/VII, and CEI 23-5.

The power adapter 100 further includes a power converter module 110. The power converter module 110 includes electronic circuitry for converting the power supply from the power grid 104 into a power supply suitable for use by the electrically-operated device 102. Many electrically-operated devices 102 require a DC power source. In such instances, the power converter module 110 can include electronic circuitry such as, for example, a transformer, a rectifier circuit, a capacitor, a switch, a linear regulator, combinations thereof and/or the like. On the other hand, some electrically-operated devices require an AC power source operating at a different voltage or frequency than that of the power grid. In those instances, the power converter module can include electronic circuitry such as, for example, step-down transformer or step-up transformer circuits.

The power converter module 110 is electrically coupled to the hot contact 106 and the neutral contact 108 by a hot source lead 112 and a neutral source lead 114. The power converter module 110 is electrically coupled to the electrically-operated device 102 by a hot device lead 122 and a neutral device lead 124.

In some instances, the power converter module 110 is located within a housing of the electrically-operated device 102. In other instances, the hot contact 112, the neutral contact 114, and the power converter module 110 are built into a housing that is separate from the housing of the electrically-operated device 102. The ends of device leads 122,124 opposite the power converter module 110 may be formed into a male or female plug for connecting to a corresponding socket in the electrically-operated device 102. Such a configuration is commonly referred to as a "wall wart" or "power brick." In still other instances, the power converter module 110 is located in a housing that is separated from the electrically-operated device 102 and the contacts 112,114. Again, the ends of device leads 122,124 opposite the power converter module 110 may be formed into a male or female plug for connecting, at one end, to a corresponding socket in the electrically-operated device 102. Optionally, the other ends of the device leads may be formed into a male or female plug for connecting to a corresponding socket in the power conversion module 110. Similarly, the ends of the source leads 112,114 opposite the contacts 106,108 may be formed into a male or female plug for connecting to a corresponding socket in the power converter module 110.

Figure 2:
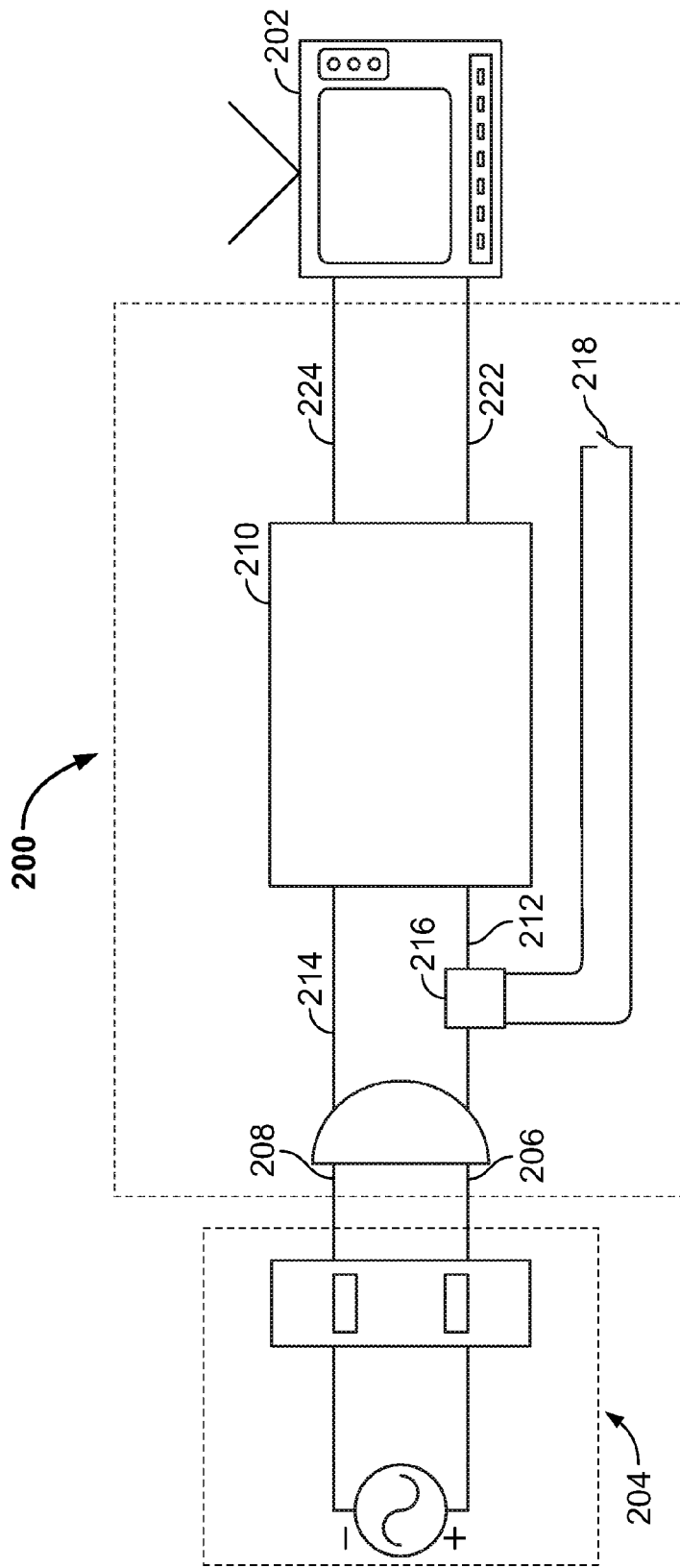
FIG. 2 illustrates a circuit diagram for an AC power adapter according to one embodiment.

Referring to FIG. 2, a circuit diagram is illustrated for a power adapter 200 for connecting an electrically-operated device 202 to a power grid 204 according to one embodiment of the present concepts. The power adapter 200 includes at least one hot contact 206 and hot source lead 212, at least one neutral contact 208 and neutral source lead 214, a power converter module 210, at least one hot device lead 222 and at least one neutral device lead 224 as described above with respect to FIG. 1. The power adapter 200 further includes a relay circuit 216 for selectively isolating the voltage passing through the hot source lead 212 from the hot contact 206 to the power converter circuit 210. The relay circuit 216 is electrically coupled to a switch circuit 218. When the switch 218 is activated (i.e., closed), a current passes to the relay circuit 216, which in turn causes the hot source lead 212 to pass the voltage from the hot contact 206 to the power converter module 210. When the switch 218 is deactivated (i.e., open), the relay circuit 218 prohibits the hot source lead 212 from passing voltage from the hot contact 206 to the power converter module 210. Thus, when the switch circuit 218 is deactivated, no voltage is drawn from the power grid 204.

Any suitable relay circuit 216 can be utilized such as, for example, a solid-state relay, an electromechanical relay, latching relay, reed relay, mercury-wetted relay, polarized relay, machine tool relay, contactor relay, buchholz relay, forced-guided contacts relay, combinations thereof and/or the like. The relay circuit 216 can be located within the same housing as the power converter module 210 or external thereto. Similarly, any suitable switch can be utilized such as, for example, a single pole-single throw switch, a single pole-double throw switch, a single pole changeover switch, a double pole-single throw switch, a double pole-double throw switch, a double pole changeover switch, an intermediate switch, a biased switch, a mercury tilt switch, a knife switch, a transistor, a centrifugal switch, a DIP switch, a Hall-effect switch, an inertial switch, a membrane switch, a toggle switch, a transfer switch, combinations thereof and/or the like. The switch circuit 218 can be located in the same housing as the power converter module 210, external to the housing of the power converter module 210, and/or in the housing of the electrically-operated device 202. It is contemplated that according to some embodiments, the switch circuit 218 can be electrically and/or mechanically coupled to a power ON/OFF button or dial located in or on the electrically-operated device 202. In accord with other embodiments, the switch 218 is a remotely-operated switch that can be activated and/or deactivated, for example, via an infrared signal, an ultraviolet signal, combinations thereof and/or the like. In accord with still other embodiments, the switch 218 is activated and/or deactivated by a timer.

It is further contemplated that electrically-operated devices 202 may include electronic circuitry that automatically deactivates and/or activates the switch circuit 218 depending upon whether power is required for the electrically-operated device 202. For example, a cellular telephone continues to draw power from the power grid when connected to a conventional power adapter regardless of whether the cellular telephone battery is completely charged. It is contemplated that the switch circuit 218 can be connected to electronic circuitry within the cellular telephone that deactivates the switch circuit 218 once the battery becomes fully charged and reactivates the switch once the battery loses a threshold quantity of charged energy. As another example, televisions typically require standby power to enable instant power-up by remote control. It is contemplated that the television can include a small battery for maintaining the television in standby mode and electronic circuitry for activating and deactivating the switch circuit 218 when the battery needs to be recharged (e.g., when the battery charge falls below a predetermined threshold).

Figure 3:
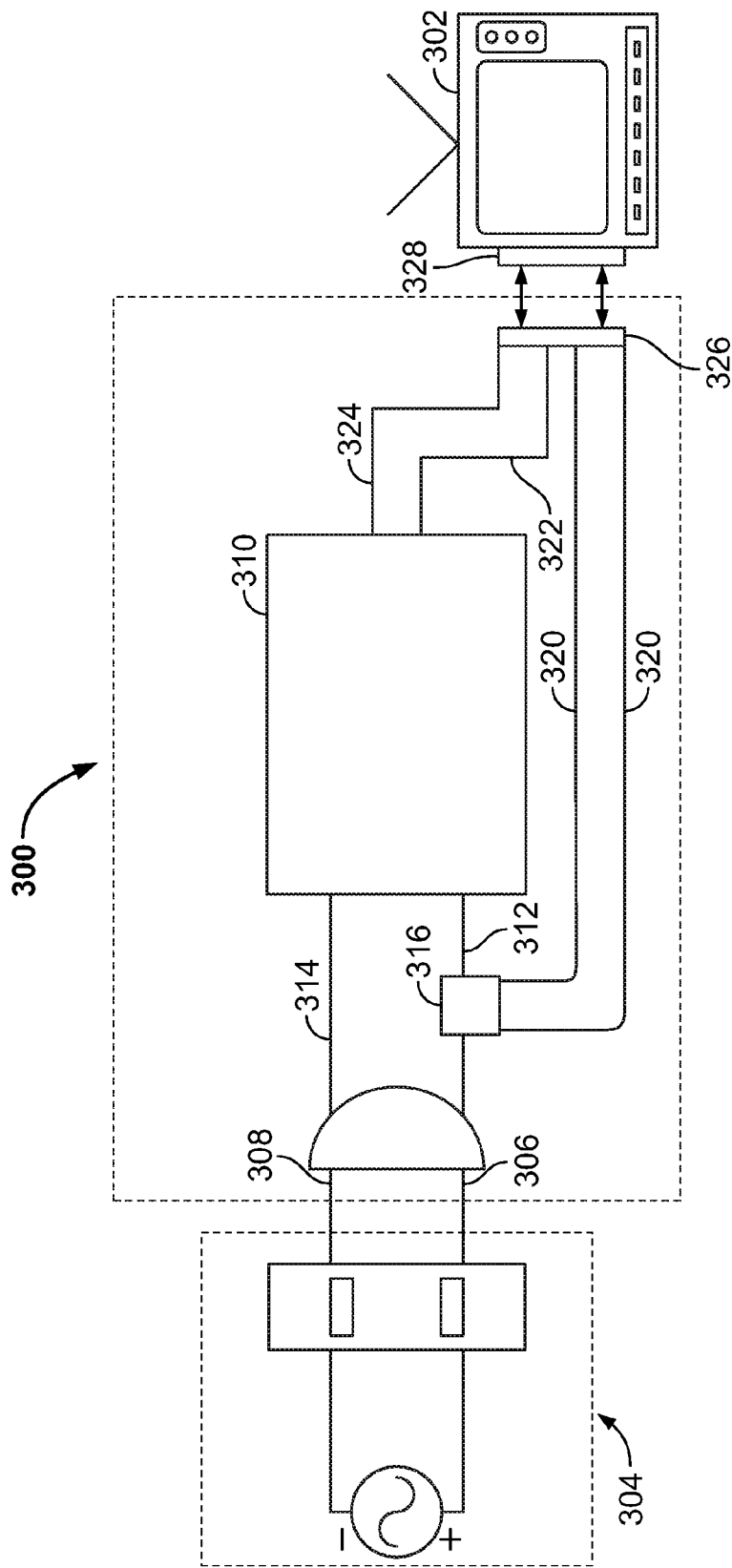
FIG. 3 illustrates a circuit diagram for an AC power adapter according to another embodiment.

According to an alternative embodiment, the switch circuit 218 of the embodiment illustrated in FIG. 2 can be omitted as shown in FIG. 3. Referring to FIG. 3, a power adapter 300 includes at least one hot contact 306 and hot source lead 312, at least one neutral contact 308 and neutral source lead 314, a power converter module 310, at least one hot device lead 322, at least one neutral device lead 324 and a relay circuit 316 as described above with respect to FIG. 2. The power adapter further includes relay leads 320 coupled to the relay circuit 316 at one end. The other end of the relay leads 320 are formed into a male or female plug 326 with the hot device lead 322 and the neutral device lead 324 for electrical and mechanical coupling with a corresponding socket 328 in an electrically-operated device 302. According to this embodiment, whenever the plug 326 is connected to the socket 328 of the electrically-operated device 302, a current is passed to the relay circuit 316 via the relay leads 320. The relay circuit 316 closes allowing the hot source lead 312 to pass voltage from the hot contact 306 to the power converter module 310. Conversely, whenever the plug 326 is removed from the socket 328, no current is passed to the relay circuit 316. Thus, when an electrically-operated device is not connected to the power adapter 300, no voltage is drawn from the power grid 304.

A power adapter 300 according to this embodiment may be particularly useful in situations where an electrically-operated device is only connected to the power adapter 300 for battery charging purposes. For example, a conventional power adapter for a cellular telephone continuously draws power from the power grid when the power adapter is plugged into the wall socket regardless of whether the cellular phone is connected to the power adapter. This is because the power converter module forms a closed circuit drawing power from the power grid. When a power adapter 300 according to this embodiment is utilized, no power is drawn from the power grid when the cellular phone is not connected for charging.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention, which is set forth in the following claims.

What is claimed is:

1. An AC power adapter for providing voltage to an electrically-operated device, the AC power adapter comprising:

a power converter module electrically coupled to an AC power source via at least one hot lead and at least one neutral lead, the power converter module being configured to convert AC voltage received from the AC power source to at least one voltage suitable for use by the electrically-operated device; and a relay circuit coupled to the at least one hot lead to control the AC voltage passing from the AC power source to the power converter module.

2. The AC power adapter of claim 1 further comprising a switch circuit coupled to the relay circuit to control an electrical current applied to the relay circuit, the relay circuit being configured to pass the AC voltage from the AC power source to the power converter module in response to the electrical current applied to the relay circuit.

3. The AC power adapter of claim 2, wherein the switch circuit is coupled to a push button or a dial that is mechanically-operable to control the electrical current applied to the relay circuit.

4. The AC power adapter of claim 2, wherein the switch circuit is remotely-operable to control the electrical current applied to the relay circuit.

5. The AC power adapter of claim 2, wherein the switch circuit is coupled to a timer to control the electrical current applied to the relay circuit.

6. The AC power adapter of claim 2, wherein the electrically-operated device includes control circuitry, the control circuitry being coupled to the switch circuit to control the electrical current applied to the relay circuit.

7. The AC power adapter of claim 1 further comprising:
at least one relay lead having a first end and a second end, the at least one relay lead being coupled to the relay circuit at the first end, the at least one relay lead being formed into a relay plug at the second end.

8. The AC power adapter of claim 7, wherein the relay plug is configured to be inserted into at least one socket of the electrically-operated device.

9. The AC power adapter of claim 8, wherein the relay circuit is configured to pass the AC voltage from the AC power source to the power converter module in response to the relay plug being inserted into the at least one socket.

10. The AC power adapter of claim 2, wherein the switch circuit is disposed in a separate housing from the power converter module and the relay circuit.

11. The AC power adapter of claim 2, wherein the switch circuit is disposed in the housing of the electrically-operated device.

12. The AC power adapter of claim 1, wherein the relay circuit is disposed in a separate housing from the power converter module.

13. The AC power adapter of claim 1, wherein the power converter module is disposed in the housing of the electrically-operated device.

14. An AC power adapter for providing voltage to an electrically-operated device, the AC power adapter comprising:
a power converter module electrically coupled to a power source via at least one hot lead and at least one neutral lead, the power converter module being configured to convert a first voltage received from the power source to at least one second voltage suitable for use by the electrically-operated device;

at least one device lead having a first end and a second end, the at least one device lead being coupled to the power converter module at the first end of the at least one device lead, the at least one device lead being formed into a device plug at the second end of the at least one device lead;

at least one relay lead having a first end and a second end, the at least one relay lead being coupled to the relay circuit at the first end of the at least one relay lead, the at least one relay lead being formed into a relay plug at the second end of the at least one relay lead, the device plug being integral with the relay plug; and a relay circuit coupled to the at least one hot lead to control the first voltage passing from the power source to the power converter module, the relay circuit being configured to pass the first voltage from the power source to the power converter module in response to the relay plug being received in at least one socket of the electrically-operated device.

15. A system for charging an electrically-operated device, the system comprising:
an AC power source;

an electrically-operated device including a battery, the battery having a charge level indicative of an electrical potential stored on the battery;

a power converter module electrically coupled to the AC power source via at least one hot lead and at least one neutral lead, the power converter module being configured to convert an AC voltage received from the AC power source to at least one voltage suitable for use by the electrically-operated device;

a relay circuit coupled to the at least one hot lead to control the AC voltage passing from the AC power source to the power converter module; and a switch circuit coupled to the relay circuit to control an electrical current applied to the relay circuit, the relay circuit being configured to pass the AC voltage from the AC power source to the power converter in response to the electrical current, the switch circuit being configured to pass the electrical current to the relay circuit in response to the charge level of the battery.

16. The system of claim 15, wherein the relay circuit includes at least one of an a solid state relay, an electromechanical relay, a latching relay, a reed relay, a mercury-wetted relay, a polarized relay, a machine tool relay, a contractor relay, a buchholz relay, and a force-guided contacts relay.

17. The system of claim 15 wherein the switch circuit is electrically coupled to an electronic circuit in the electrically-operated device operable to deactivate the switch circuit once the battery becomes fully charged.

18. The system of claim 17, wherein the switch circuit is electrically coupled to an electronic circuit in the electrically-operated device operable to re-activate the switch circuit once the battery loses a threshold quantity of charged energy.

19. The system of claim 15, wherein the switch circuit is electrically coupled to a power on/off button on the electrically-operated device.

20. The system of claim 15, wherein the switch circuit is mechanically coupled to a power on/off button on the electrically-operated device.

* * * * *